May 8, 1928.

T. CURETON

ADJUSTABLE STEP BEARING

Filed April 27, 1922

1,668,839

Patented May 8, 1928.

1,668,839

UNITED STATES PATENT OFFICE.

THOMAS CURETON, OF DAYTON, OHIO.

ADJUSTABLE STEP BEARING.

Application filed April 27, 1922. Serial No. 556,829.

This invention relates to step bearings, and one of the principal objects of the invention is to provide a step bearing which is so constructed as to provide for both horizontal and vertical adjustment.

Another object of the invention is to provide an adjustable step bearing which is so constructed that both horizontal and vertical adjustment may be secured without in any way disturbing the assemblage of which the bearing forms a part.

Other objects and advantages will be apparent from the description thereof set out below when taken in connection with the accompanying drawing.

Figure 2:
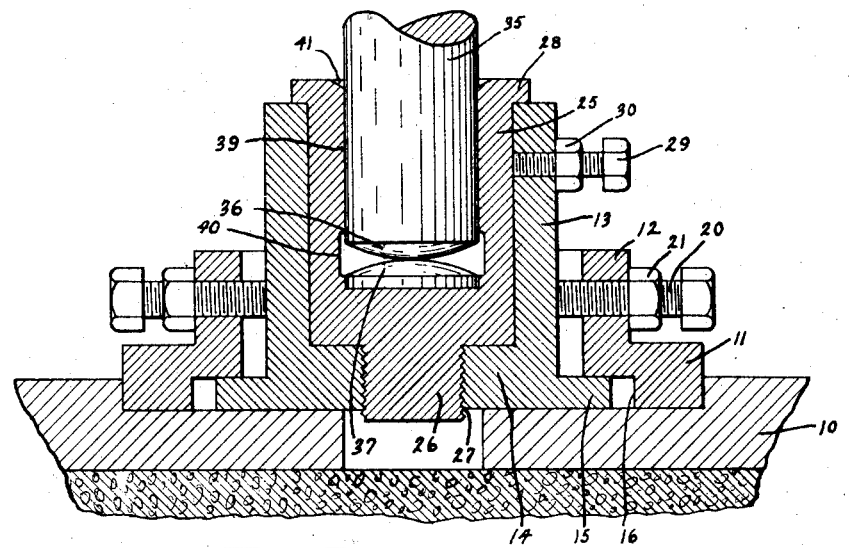
Figure 1:
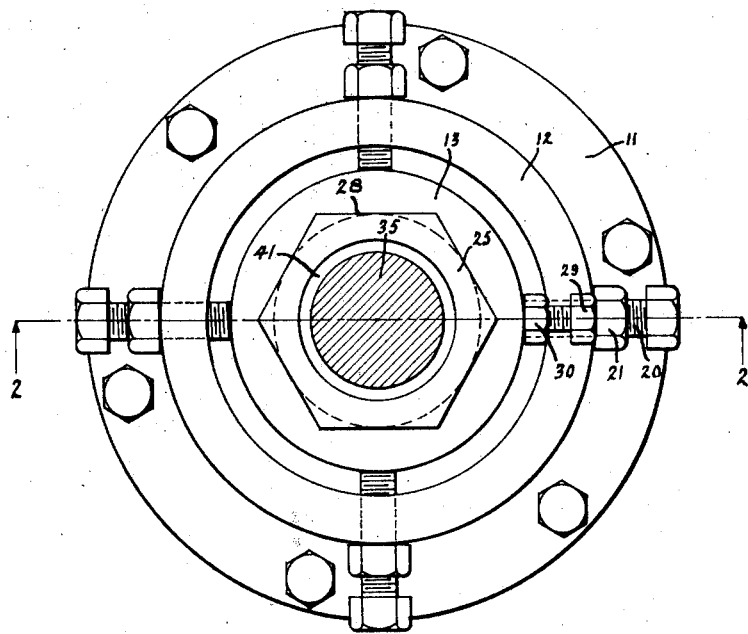

In the drawing, in which like characters of reference designate like parts throughout the several views thereof, Fig. 1 is a plan view of a bearing constructed in accordance with this invention; and Fig. 2 is a sectional view along the line 2—2 of Fig. 1.

In the drawing, the numeral 10 designates a base or foundation for supporting the apparatus with which this bearing is associated. The bearing is, of course, of general application, but it was particularly designed for use with a digester tank for sewage and the like, and a very substantial construction is therefore essential, because of the considerable size and weight of the apparatus. Rigidly secured to the base 10, in any desired manner, is the sleeve holder 11, which is made in the form of a cylindrical ring, having an upstanding flange 12. Positioned within the ring 11 is the bearing sleeve 13, which is closed at one end by means of the base portion 14. An outstanding flange 15, is carried by the bearing sleeve, which, when the device is in assembled position, extends into the groove 16, within the sleeve holder 11, the construction being such that the bearing sleeve is firmly retained in place. However the bearing sleeve 13 is not rigidly secured to the base 10, but has the lower surface thereof, which contacts with the upper surface of the base 10, so constructed that it may slide across the member 10. Mounted within suitably threaded passages within the upstanding flange 12 is a plurality of adjusting bolts 20. As shown there are four of these bolts, arranged substantially 90° apart, and by proper manipulation thereof the bearing sleeve 13 may be moved horizontally to secure any desired setting thereof. Lock nuts 21 are preferably provided for holding the adjustment, but other locking means may be used if desired.

Mounted within the bearing sleeve 13 is the bearing proper 25, which is itself made in the form of a hollow sleeve, closed at one end. This member 25 is so proportioned that it fits snugly within the opening in the sleeve 13, and a threaded extension 26 is carried by the closed end which extension is coaxial with the member 25 and is adapted for threaded engagement within the correspondingly threaded opening 27 in the base member 14 of the bearing sleeve 13. The member 25 is of such length that its outer end always extends beyond the outer or upper end of the bearing sleeve 13, and is shaped, as shown at 28, to provide a wrench receiving portion. As shown particularly in Fig. 1 this outer end 28 is hexagonal to receive any conventional type of wrench, but it may be constructed to receive any other desired type of wrench. For example it might be provided with slots or small pockets, and adapted to receive a spanner wrench. By rotation of the member 25 vertical adjustment thereof is secured, to compensate for wear in the bearing. A set screw 29, which is preferably provided with a suitable lock nut 30 is threadedly mounted within the bearing sleeve 13 to lock the member 25 against rotation relative to the bearing sleeve.

The passage within the member 25 is adapted to receive the lower end of the rotatable shaft 35, the lower end of that shaft being spherical shaped, as shown at 36, and adapted to cooperate with a correspondingly shaped bearing button 37, which is positioned in the bottom of the passage 39, of the member 25. If desired the bearing button 37 and the cooperating end 36 of the shaft may be constructed of such material, and so treated, as to wear very slowly; but ordinary steel will function very satisfactorily, under ordinary circumstances, as the material constituting these cooperating parts. The passage 39, adjacent the lower end, which houses the bearing button 37, is cut away as shown at 40 to provide a lubricant receiving pocket. The outer end of the member 25 is cut away as shown at 41, to provide a groove for receiving lubricant, the lubricant introduced into this groove working down between the cooperating surfaces of the rotating shaft 35 and the stationary member 25, to supply lubricant to the pocket 40 and keep the members within the pocket 40 running in a bath of oil.

By means of this described construction the step bearing may be adjusted to give any desired horizontal setting of the shaft receiving member 25, and in addition the member 25 may be adjusted vertically to compensate for wear. Of course adjustable step bearings are old, but this particular step bearing is peculiarly valuable, because of its extreme simplicity and low cost of manufacture, its ruggedness and strength, and the ease with which vertical adjustment may be secured without in any way disturbing the horizontal setting, and vice versa, or disturbing the setting of any of the cooperating members of the apparatus.

While the form of apparatus herein described constitutes preferred embodiments of the invention, it is to be understood that the invention is not limited to this precise form of apparatus, and that changes may be made in either without departing from the scope of the invention which is defined in the appended claim.

What is claimed is:

A bearing of the character described comprising in combination, a sleeve holder, having a fixed inwardly extending retaining shoulder thereon, an upwardly extending flange on said shoulder, adjusting bolts mounted in said flange, and means for rigidly connecting said sleeve holder to a bed plate, or the like; a bearing sleeve positioned within the sleeve holder, an outwardly extending flange at the base thereof cooperating with the said retaining shoulder to hold said bearing sleeve against vertical or tilting movement while allowing horizontal movement thereof, said sleeve having a threaded passage through the base thereof; a bearing member having a cylindrical pocket therein to receive the lower end of a rotatable shaft, a bearing button within said cylindrical pocket upon which the lower end of the said shaft rests, a threaded extension carried by the lower end of said bearing member and threadedly mounted within the threaded passage in the bearing sleeve, wrench receiving surfaces upon the outer end of the bearing member for receiving a wrench to effect rotation of said bearing member to impart vertical movement thereto.

In testimony whereof I hereto affix my signature.

THOMAS CURETON.